United States Patent Office 3,639,554
Patented Feb. 1, 1972

3,639,554
METHOD OF MAKING SYNTHETIC-RESIN FOILS WITH PAPER-LIKE CHARACTERISTICS
Thomas Gough Hutt, 936 Pretorius St., Pretoria, Transvaal, Republic of South Africa
No Drawing. Filed July 28, 1969, Ser. No. 845,500
Claims priority, application Republic of South Africa, July 29, 1968, 68/4,893
Int. Cl. B29c 17/07
U.S. Cl. 264—95     5 Claims

ABSTRACT OF THE DISCLOSURE

A method of making synthetic-resin foils, especially foils consisting in substantial part of a thermoplastic wherein 5 to 20% by weight of the mixture adapted to be formed into the foil is made up of a masterbatch or color concentrate consisting of 50 to 75% by weight of a pigment (organic or inorganic), preferably titanium dioxide, and 50 to 25% by weight of a wax, the latter making up the remainder of the color concentrate or masterbatch. The wax is a saturated hydrocarbon having more than 33 carbon atoms per molecule (with a carbon number of at least 33) and an average molecular weight of about 750.

---

The present invention relates to the production of synthetic-resin foils having the characteristics of paper, improved shapability and excellent physical properties. More particularly, this invention relates to a method of making such foils to a composition adapted to be incorporated in such foils in conjunction with a synthetic resin, and, in general, to the use of a masterbatch or color concentrate in the production of such foils.

It has already been proposed to form synthetic-resin foils of macromolecular thermoplastic materials by extruding the plastified material through broad nozzles, between foil-forming rolls, or as a tube of relatively thick character, the tube being blown or stretched to decrease the wall thickness, thereby forming the foil.

In connection with such methods, one may add pigments to synthetic-resin foils in the form of a pigment concentrate or masterbatch (color concentrate), the thermoplastic material being combined with the masterbatch or color concentrate in the form of granules or powders. The combination of the masterbatch or color concentrate with the synthetic resin (thermoplastic) is followed by an intimate mixture of the materials independently of plastification or concurrently therewith, the plastification occurring, for example, in a worm or screw-type plastifying apparatus ahead of the extruder.

In general, a highly intensive mixing process must be carried out to insure homogeneous distribution of the color concentrate in the resin. In conventional systems, for the most part, the color concentrate or masterbatch makes up a very minor proportion of the extrudable mixture, i.e. is present in an amount much less than the synthetic resin.

In connection with such systems, it has been found that while thorough coloring of the foil requires substantial proportions of the pigment, it is impossible by conventional techniques to incorporate large amounts of pigment in the synthetic resin mass without decreasing the mechanical strength or otherwise disadvantageously affecting the mechanical properties of the synthetic-resin foils.

Moreover, in earlier attempts to increase the proportion of pigment in the extrudable mass in order to obtain effective coloration, it was found that uniform dispersion is not obtained, in spite of the fact that long-term and intensive mixing is carriedo ut. The problem is especially acute when it is desired to produce foils with paper-like characteristics by adding sufficient quantities of pigment to render the foil opaque. In practical terms, this has not been possible heretofore because of the loss of mechanical properties of the foil.

It is, therefore, the principal object of the present invention to provide a method of making synthetic-resin foils and especially foils having paper-like characteristics with good mechanical properties.

A further object of this invention is to provide a method of forming synthetic-resin foils which avoids the disadvantages mentioned earlier and permits the incorporation in an extrudable synthetic-resin mass of a relatively high proportion of pigment.

Yet another object of the instant invention is to provide an improved system for incorporating pigmentatious materials in synthetic resin.

It is a further object of this invention to provide a high-strength synthetic-resin foil with good mechanical characteristics, uniform coloration and a high degree of opacity.

It is still another object of the instant invention to provide a color concentrate or masterbatch adapted to be incorporated more uniformly and homogeneously into extrudable synthetic-resin mixtures without decreasing the mechanical properties of the resulting foil.

It has been found, most surprisingly, that a masterbatch capable of attaining all of the aforedescribed advantages and avoiding the disadvantages enumerated above, in accordance with the present invention, can be formed by combining 50 to 75% by weight, preferably 65% by weight, of organic or inorganic pigments adapted to be incorporated in synthetic resins and, especially titanium dioxide, with 50 to 25% by weight, preferably 35% by weight, of a wax and, if desired, with a wetting agent as will be apparent hereinafter. When a masterbatch or color concentrate of this composition is incorporated with a thermoplastic synthetic resin, especially high-pressure polyethylene, in an extrudable mixture, it is possible to obtain, upon foil formation, synthetic-resin foils or films having paper-like characteristics, mechanical properties which do not differ materially from those of the foil in the absence of the color concentrate or masterbatch, and uniform coloration with a high degree of opacity.

According to a more specific feature of this invention, the masterbatch or color concentrate of the aforedescribed composition is combined in an amount between 5 to 20% by weight, preferably 10% by weight, with the synthetic resin and is, therefore, present in a "minor" proportion with thermoplastic synthetic resin making up the balance of the mixture. It has been found, however, that when high-pressure polyethylene with a low-melting index is used, up to 50% by weight of the extrudable mixture can be constituted by the masterbatch or color concentrate. The proportions of pigment and wax in the color concentrate have been found to be critical for the purpose of obtaining high-strength synthetic-resin foils with paper-like characteristics.

The wax, according to the instant invention, is preferably a saturated hydrocarbon having a carbon number of at least 33, i.e. at least 33 carbon atoms per molecule and an average molecular weight of about 750.

The resulting foils have been characterized by covering coloration, i.e. a coloration (white when titanium dioxide is used) such that the foil is opaque without decrease in the mechanical properties of the foil. Moreover, the surface texture of the foil, when produced with the indicated proportions of the masterbatch or color concentrate, resembles that of writing paper. Most surprisingly, it has been found that the use of a wax, as indicated above, increases the desirability of the color concentrate and the pigment contained therein, in the synthetic resin and thereby improved the homogeneity of the dispersion while reducing the mixing time necessary to accomplish the dispersion. Moreover, the wax appears to impart lubricant character to the foil and facilitates extrusion, calendering and other processing steps in the formation of the foil. This is especially desirable for high-molecular weight synthetic resins which are characterized by low flowability, the wax appearing to act as a lubricant even during the mixing stage. The paper-like foils produced in accordance with the present invention may have a high gloss which in many instances is highly desirable.

While the thermoplastic which may be used accordance with the present invention include polystyrenes, polyvinylchlorides, polyfluoroethylenes such as polytrifluorochloroethylene, polyesters such as polyethyleneglycolterephthalate, polyolefins such as polyethylene and polypropylene and polymeric higher olefins.

It will be self-evident that the invention is also applicable to copolymers of, for example, styrene, vinyl chloride, fluoroethylenes, olefins and the like, as well as polymer mixtures of the polymers or copolymers enumerated above. Best results are obtained, however, when high-pressure polyolefins or low-pressure polyolefins produced with the aid of a Ziegler catalyst are employed in conjunction with the color concentrate or masterbatch of the present invention.

According to this invention, the masterbatch is used together with linear polyethylene having a density between 0.94 and 0.97 g./cm.$^3$, a reduced specific viscosity (viscosity number) as measured in a Ubelohde viscometer (ASTM–D1243–60), at 135° C. in a 0.1% solution in decahydronophthalene, between 1.65 and 10.5 dl./g. (corresponding to an average molecular weight between 60,000 and 500,000, calculated as described by W. Weslau, Kunststoffe, 49, (1959), page 230. Preferably the polymer has a reduced specific viscosity (viscosity number) between 4.5 and 8.5, corresponding to a molecular weight of 200,000 to 400,000. Best results are obtained when the macro-molecular thermoplastic, adapted to be blown, drawn or extruded to form the foils as described above are tempered at a temperature between 3° and 80° C. above the crystal melting point. When blowing techniques are used, the extruded tube at a temperature of 3° to 80° C. above the crystal melting point is blown and stretched in a ratio of 1:4 to 1:10 and the foil thickness drawn to between 5 and 50 microns, whereby the partly crystalline macromolecular material simultaneously receives a circumferential and longitudinal stretch.

Among the organic and inorganic pigments which may be used in accordance with the present invention are titanium dioxide which is preferred as mentioned earlier, and zinc sulfide, cadmium sulfide, phthalocyanine, ultramarine blue and carbon black. The resulting foil has a slightly rough surface texture, substantially no transparency, feels dry to the touch like paper and its increase in volume after wrinkling is insignificant. The paper-like foil may thus be used to advantage in rubbish bags or the like. It may be noted that the foil by comparison with prior art polyolefin foils, tends to pick up electrostatic charge to a much lesser extent, tends to lie flatter and otherwise is more easily handled. The formation of the color concentrate or masterbatch can be carried out in any conventional pigment mixer (roll-type mixer or blender) and a wetting agent may be incorporated in the masterbatch as desired to a small extent. A suitable wetting agent is a stearate such as sodium stearate which may be present in the masterbatch in an amount ranging from 0.01 to 1% by weight.

EXAMPLE 800 g. of synthetic paraffin with a molecular weight of about 750 (average) is mixed with 1070 g. of titanium dioxide in a rapidly operating blender whose mixing chamber is cooled to form a homogeneous mixture in the form of a flowable powder. This premixed product is then passed through a roll-type pigment mill with heated rolls and with minimum friction of counter-rotating mill surfaces to complete the homogenization of the masterbatch.

The mixing process is carried out at a temperature above the softening point of the wax so that a relatively fluid masterbatch is stripped from the last roll, cooled to solidify the produce which is then broken up and comminuted in conventional manner. 10% by weight of this masterbatch is combined with low-pressure polyethylene of a reduced specific viscosity of 3.5 dl./g. in the form of a granulate in a screw-type plastifying chamber. The plastified mass is extruded in the form of a tube through an annular nozzle of a foil-blowing head at a temperature above the crystallization melting point of the mass. The nozzle opening has a diameter of 75 mm. and a gap width of 0.7 mm. The extruded tube is tempered at a temperature between 3° and 80° C. above the crystal melting point and blown to 5.8 times the diameter of the extrusion nozzle, while drawing the tube longitudinally 5.8 times its original length. After flattening the resulting foil, it is found to have a double width of 680 mm. and a thickness of each layer of 0.02 micron.

I claim:
1. A process for the production of synthetic resin foils having paper-like characteristics, comprising the steps of admixing with high-density polyethylene, 5 to 20 percent by weight of a color concentrate consisting essentially of 50 to 75 weight percent of titanium-dioxide pigment and 50 to 25 weight percent of a saturated hydrocarbon wax blended with said pigment and having more than 33 carbon atoms per molecule; and forming a foil from the mixture of the thermoplastic synthetic resin and said color concentrate by the steps of:
   (a) extruding the mixture of the polyethylene with the color concentrate to form a tube;
   (b) heating the extruded tube to a temperature between 3° and 80° C. above it crystal melting point;
   (c) circumferentially and longitudinally stretching said tube after heating same with a linear ratio of 1:4 to 1:10 to a thickness between 5 and 50μ.
2. The process defined in claim 1 wherein said wax has an average molecular weight of about 750.
3. The process defined in claim 1 wherein said tube is stretched at least in part by blowing said tube.
4. The process defined in claim 1 wherein said mixture consists at least of 50% by weight of high pressure polyethylene with a low-melting index.
5. The process defined in claim 1 wherein said concentrate further comprises a wetting agent.

References Cited

UNITED STATES PATENTS

| 3,035,003 | 5/1962 | Kessler | 260—28.5 |
| 3,407,161 | 10/1968 | Rundle | 260—28.5 |

FOREIGN PATENTS

| 841,808 | 7/1960 | Great Britain | 264—95 |
| 926,393 | 5/1963 | Great Britain | 264—95 |
| 1,059,346 | 2/1967 | Great Britain | 264—95 |
| 1,087,720 | 10/1967 | Great Britain | 264—95 |

ROBERT F. WHITE, Primary Examiner

T. PAVELKO, Assistant Examiner

U.S. Cl. X.R.

264—209, 211